3,585,201
10-ALKOXY 9,10-DIHYDRO ERGOLINE
DERIVATIVES
Federico Arcamone, Luciano Dorigotti, Alfredo Glaesser, and Silvio Redaelli, Milan, Italy, assignors to Società Farmaceutici Italia, Milan, Italy
No Drawing. Filed June 26, 1968, Ser. No. 740,108
Claims priority, application Italy, June 28, 1967, 17,750/67
Int. Cl. C07d 43/20
U.S. Cl. 260—268                7 Claims

ABSTRACT OF THE DISCLOSURE

Described are ergoline derivatives of the formula:

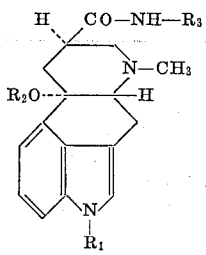

where $R_1$ is selected from the group consisting of H and alkyl having from 1 to 4 carbon atoms,
$R_2$ is an alkyl having from 1 to 4 carbon atoms,
$R_3$ is selected from the group consisting of

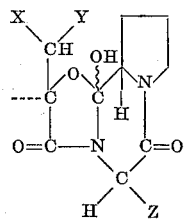

where
X and Y are selected from the group consisting of H and $CH_3$;
Z is selected from the group consisting of benzyl, isopropyl and isobutyl.

These compounds have among other properties a higher adrenolytic hypotensive activity.

Also described is a process for their preparation.

---

The present invention relates to new ergoline derivatives useful in therapy and to a process for preparing them. More particularly, the object of the present invention are the derivatives of the 10α-alkoxy-9,10-dihydroergoline having the following structural formula:

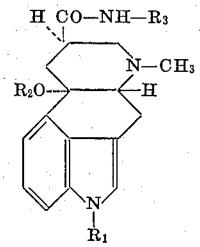

where
$R_1$ is selected from the group consisting of H and alkyl having from 1 to 4 carbon atoms,
$R_2$ is an alkyl having from 1 to 4 carbon atoms,
$R_3$ is selected from the group consisting of

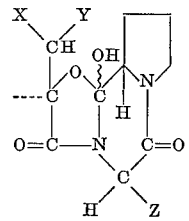

where
X and Y are selected from the group consisting of H and $CH_3$;
Z is selected from the group consisting of benzyl, isopropyl and isobutyl.

The products of the present invention show an adrenolytic, hypotensive activity, and an activity controlling the cardiovascular circle, and they are employed in therapy.

A further object of the present invention is the process for preparing the derivatives of the 10α-alkoxy-9,10-dihydro-ergoline, having the indicated structural formula. The process may be represented by the reaction scheme:

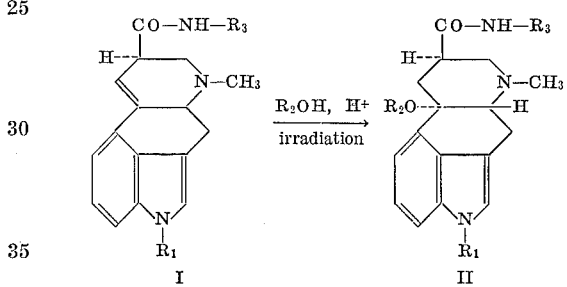

wherein $R_1$, $R_2$ and $R_3$ have the above meaning. The starting products of Formula I are known in literature (A. Hofmann, Die Mutterkorn Alkaloide; 1964). The alkylation of the nitrogen atom in the 1-position of the ergoline ring may be performed before or after the irradiation. This alkylation essentially consists in reacting the compound with an alkyl halide, such as alkyliodide, in liquid ammonia and in the presence of metal potassium. The introduction of the alkoxy group in the 10-position is effected by luminous irradiation of the starting compound (I), dissolved in an alcohol of formula $R_2OH$, in the presence of an organic acid, such as formic or acetic acid, a weak inorganic acid or a diluted strong inorganic acid. The reaction may be carried out at a variable temperature and for a variable period of time, because, in fact, these conditions do not limit the reaction. The reaction is preferably carried out at a temperature of from 0° to 30° C. for a period of 1–30 hours. The reaction is effected in an oxygen-free atmosphere, for example carbon dioxide. The products (II) which have been obtained, are separated and purified according to the known techniques of extraction and crystallization.

Typical compounds of the invention, belonging to this class, are: 10α - methoxy - 9,10 - dihydroergotamine, 1-methyl - 10α - methoxy - 9,10 - dihydroergotamine, 10α-methoxy - 9,10 - dihydroergosine, 1 - methyl - 10α-methoxy - 9,10 - dihydroergosine, 10α - methoxy - 9,10-dihydroergocristine, 1 - methyl - 10α - methoxy - 9,10-dihydroergocristine, 10α - methoxy - 9,10 - dihydroergocriptine, 1 - methyl - 10α - methoxy - 9,10 - dihydroergocriptine, 10α - methoxy - 9,10 - dihydroergocornine, 1-methyl - 10α - methoxy - 9,10 - dihydroergocornine.

The compounds of the invention have a high adrenolytic hypotensive activity and an activity controlling the cardiovascular system, and have a low toxicity. Their adrenolytic activity in vitro has been determined on the seminal bladder of guinea-pigs. In Table 1 are values of the inhibiting dose 50%, CI 50 (in γ/ml.), showing the concentration inhibiting 50% of the effect of adrenalin, in comparison with similar dosages of the known products ergotamine and ergocriptine.

TABLE 1

| Compounds: | CI 50 (γ/ml.) |
|---|---|
| Ergotamine | 0.07 |
| Ergocriptine | 0.02 |
| 10α-methoxy-9,10-dihydroergotamine | 0.005 |
| 1 - methyl - 10α - methoxy-9,10-dihydroergotamine | 0.005 |
| 10α-methoxy-9,10-dihydroergocriptine | 0.005 |
| 1 - methyl - 10α - methoxy - 9,10 - dihydroergocriptine | 0.001 |
| 10α-methoxy-9,10-dihydroergocristine | 0.005 |
| 1 - methyl - 10α - methoxy - 9,10 - dihydroergocristine | 0.005 |

The adrenolytic activity in vivo of the products of the present invention has been determined in the rat, by administration of the products intravenously and orally.

Table 2 reports the results obtained of the inhibiting dose 50%, DI 50, expressed in mg./kg., intravenously administered, that is the dose inhibiting 50% of the lethal effect of adrenaline, in comparison with ergocriptine.

TABLE 2

| Compounds: | DI 50 (mg./kg.) intravenously |
|---|---|
| Ergocriptine | 0.1 |
| 10α-methoxy-9,10-dihydroergotamine | 0.06 |
| 1 - methyl - 10α - methoxy-9,10-dihydroergotamine | 0.03 |
| 10α-methoxy-9,10-dihydroergocriptine | 0.02 |

Table 3 reports the results of the inhibiting does 50%, DI 50, expressed in mg./kg., of the products orally administered 60 minutes before administering a lethal dose of adrenalin, in comparison with 9,10-dihydroergotamine.

TABLE 3

| Compounds: | DI 50 (mg./kg.) orally |
|---|---|
| 9,10-dihydroergotamine | 15.0 |
| 1 - methyl - 10α - methoxy - 9,10 - dihydroergotamine | ≤2.5 |
| 10α-methoxy-9,10-dihydroergocriptine | 2.0 |
| 1 - methyl - 10α - methoxy - 9,10 - dihydroergocriptine | 0.6 |
| 10α-methoxy-9,10-dihydroergocristine | >2.5 |

The hypotensive activity has been determined in awake rats, experimentally hypertensive.

Table 4 reports the values of the hypotension, in mg./kg. body weight, obtained in the uninephrectomized rat made experimentally hypertensive by administration of desoxycorticosterone acetate and sodium chloride. The compounds had been administered subcutaneously at the doses indicated in the table. The results are compared with those of the known products 9,10-dihydroergotamine and 9,10-dihydroergocriptine.

TABLE 4

| Compounds | Dose (mg./kg.), subcutaneously | Hypotension in mm. Hg |
|---|---|---|
| 9,10-dihydroergotamine (control) | 1 | 40 |
|  | 5 | 21 |
| 9,10-dihydroergocriptine (control) | 1 | 30 |
|  | 5 | 50 |
| 10α-methoxy-9,10-dihydroergotamine | 1 | 15 |
|  | 5 | 29 |
| 1-methyl-10α-methoxy-9,10-dihydroergotamine | 0.1 | 16 |
|  | 1 | 40 |
|  | 2 | 62 |
| 10α-methoxy-9,10-dihydroergocriptine | 1 | 45 |
|  | 5 | 43 |
| 1-methyl-10α-methoxy-9,10-dihydroergocriptine | 0.1 | 51 |
|  | 0.5 | 65 |
|  | 1 | 72 |
| 10α-methoxy-9,10-dihydroergocristine | 0.1 | 25 |
|  | 1 | 56 |
|  | 5 | 24 |

The products of the present invention have not shown any undesired side effects. In fact, the hyperthermizing action in rabbits is quite absent in 1-methyl-10α-methoxy-9,10-dihydroergotamine and 1-methyl-10α-methoxy-9,10-dihydroergocriptine, while an increase of temperature is noted with the compared 9,10-dihydroergocriptine.

Table 5 reports the results obtained by administration of the products intravenously.

TABLE 5

| Compounds | Doses, mg./kg., intravenously | Rectal temperature changes in the rabbit, °C. |
|---|---|---|
| 9,10-dihydroergocriptine | 5 | +1.8 |
|  | 10 | +3.4 |
|  | 15 | +3.7 |
| 1-methyl-10A-methoxy-9,10-dihydroergotamine | 1 | 0 |
|  | 5 | 0 |
|  | 15 | 0 |
| 1-methyl-10A-methoxy-9,10-dihydroergocriptine | 1 | 0 |
|  | 5 | 0.4 |
|  | 15 | 0 |

While the intravenous administration route of 9,10-dihydroergocriptine in dogs causes vomiting in 100% of the treated animals at the dose as low as 0.020 mg./kg., 1-methyl-10α-methoxy - 9,10 - dihydroergotamine and 1-methyl-10α-methoxy - 9,10 - dihydroergocriptine have no emetic action even at the dose of 0.2 mg./kg.

In the therapeutic field, the products of the present invention can be administered by oral or parenteral route. Their clinical applications are preferably: hyperthyreosis, various hypertension forms, hypertensive crisis, hyperthyroidism, hemicrania, cardiac insufficiency, peripheric vascular affections, pheochromocytome. The therapeutic compositions normally employed include one or more compounds of the present invention with a certain quantity of solid or liquid vehicle. The compositions may be prepared as tablets, powders, pills or other forms pharmaceutically suitable for oral or parenteral administration. Liquid diluents duly sterilized are employed for the parenteral administration. Excipients may be employed, among which the most indicated are: starch, lactose, talc, magnesium stearate and the analogues.

The following examples are to illustrate the present invention, without limiting it.

EXAMPLE 1

10α-methoxy-9,10-dihydroergotamine 6 g. of ergotamine are dissolved in 300 ml. of anhydrous methyl alcohol mixed with 80 ml. of 99% formic acid. The solution is irradiated for 24 hours with two 250-watt HPLR Phillips lamps placed at 6 cm. from the surface of the Pyrex glass flask which contains the above solution. During the reaction, the temperature is maintained at 18°–20° C. with a water circulation retort immersed in the liquid and carbon dioxide is slowly bubbled. At the end of the reaction, 800 ml. of water and triturated ice and 200 ml. of chloroform are added to the brown solution. The mixture is then made alkaline by adding sodium bicarbonate. The chloroformic phase is separated and the aqueous phase is re-extracted twice with 100 ml. of chloroform each time. The chloroform extracts, washed with water, are dried with anhydrous sodium sulphate and filtered on a layer of active charcoal. The residue, obtained by evaporating the extracts, is taken up with a little chloroform and then passed through a column containing 12 g. of silica gel. The reaction product is eluted with chloroform containing 1% of methanol and recovered from the eluates by evaporation to dryness and by precipitation from acetone solution with ethyl ether.

1.40 g. of 10α-methoxy-9,10-dihydroergotamine melting at 180° C. (decomposition) are obtained; $[\alpha]_D^{20°} = -16°$ (c.=0.5 in pyridine). The U.V. spectrum in 96% ethanol shows adsorption maxima at 288 mμ and 294 mμ.

EXAMPLE 2

1-methyl-10α-methoxy-9,10-dihydroergotamine 240 ml. of anhydrous ammonia are condensed in a 500 ml. flask. 600 mg. of metallic potassium are added under shaking until complete decoloration. The solution is cooled to −60° C. and added thereto are 1.5 g. of 10α-methoxy-9,10-dihydroergotamine, obtained as in Example 1, milled and dried, and a solution of 2.1 g. of methyl iodide in 15 ml. of anhydrous ethyl ether, cooled to −40° C. The reaction mixture is refluxed for 30 minutes, then ammonia is evaporated off. The residue is taken up with 45 ml. of methanol, made alkaline with an aqueous solution of sodium hydroxide and, after dilution with 90 ml. of water, is extracted with 180 ml. of chloroform. The aqueous phase is re-extracted with 100 ml. of chloroform and the combined chloroform extracts are evaporated to dryness (yield: 1.1 g. of the crude product).

This product is purified by chromatography on silica gel and elution with chloroform containing 0.5% of methanol. After two crystallization from acetone, 300 mg. of the analytically pure product are obtained, melting at 220–221° C. (decomposition); $[\alpha]_D^{20°} = -16°$ (c.=0.5 in pyridine). The U.V. spectrum shows a maximum at 296 mμ.

EXAMPLE 3

10α-methoxy-9,10-dihydroergocristine 0.5 g. of ergocristine are dissolved in 300 ml. of ethyl alcohol and 75 ml. of 99% formic acid are added. The reaction mixture is irradiated under the conditions above described in Example 1, for 4 hours. By separating the product as described in Example 1, there are obtained 100 mg. of 10α-methoxy-9,10-dihydroergocristine melting at 188–191° C. (decomposition), by crystallization from acetone/ethyl ether. $[\alpha]_D^{20°} = -8°$ (c.=0.4 in pyridine). The U.V. spectrum shows maxima at 285 mμ and 292 mμ (in 96% ethyl alcohol).

EXAMPLE 4

1-methyl-10α-methoxy-9,10-dihydroergocristine

Operating as in Example 2 and starting from 420 mg. of 10α-methoxy-dihydroergocristine, 200 mg. of the product are obtained, which on crystallization from acetone melts at 215°–218° C. (with decomposition); $[\alpha]_D^{20°} = -7°$ (c.=0.38 in pyridine). The U.V. spectrum shows an adsorption maximum at 295 mμ in 96% ethyl alcohol.

EXAMPLE 5

10α-methoxy-9,10-dihydroergocriptine 1.0 g. of ergocriptine is dissolved in 150 ml. of methanol and 40 ml. of 99% formic acid are added to the solution. The reaction mixture is irradiated for 4 hours as described in Example 1. By recovering the product as described in Example 1, 400 mg. of crystalline 10α-methoxy-9,10-dihydroergocriptine are obtained from acetone, melting at 190° C. (decomposition). $[\alpha]_D^{20°} = +8°$ (c.=0.6 in pyridine). The U.V. spectrum shows maxima at 285 mμ and 293 mμ in 96% ethyl alcohol.

EXAMPLE 6

1-methyl-10α-methoxy-9,10-dihydroergocriptine

The reaction is carried out as in Example 2. From 0.5 g. of 10α-methoxy-9,10-dihydroergocriptine are obtained 220 mg. of the product, which on crystallization from acetone melts at 222–224° C. (decomposition); $[\alpha]_D^{20°} = +14°$ (c.=0.56 in pyridine). The U.V. spectrum shows a maximum at 295 mμ in 96% ethyl alcohol.

EXAMPLE 7

1-methyl-10α-methoxy-9,10-dihydroergotamine 0.50 g. of 1-methyl-ergotamine prepared from ergotamine according to the method described by F. Troxler and A. Hofmann in Helv. Chim. Acta 40, 1721 (1957), are dissolved in 100 ml. of anhydrous methanol and 25 ml. of 99% formic acid are added. The solution obtained is irradiated under the conditions described for ergotamine and the treatment is continued for 8 hours. The reaction

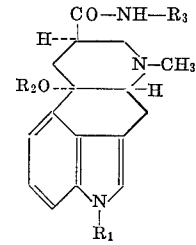

mixture is neutralized with sodium bicarbonate and then evaporated under vacuum and taken up with chloroform. The chloroformic extract is passed through a column containing 15 g. of silica gel. The product is eluted with chloroform containing from 0.5 to 1% of methanol. By crystallization from acetone 90 mg. of the product melting at 220° C. (decomposition) are obtained; $[\alpha]_D^{20°} = -16°$ (c.=0.5 in pyridine).

We claim:
1. An ergoline compound of the formula where
   $R_1$ is selected from the group consisting of H and alkyl having from 1 to 4 carbon atoms,
   $R_2$ is an alkyl having from 1 to 4 carbon atoms,
   $R_3$ is selected from the group consisting of

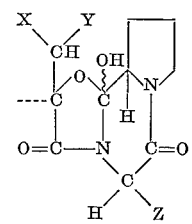

wherein
   X and Y are selected from the group consisting of H and $CH_3$;
   Z is selected from the group consisting of benzyl, isopropyl and isobutyl.

2. The compound of claim 1, which is 10α-methoxy-9,10-dihydroergotamine.

3. The compound of claim 1, which is 1-methyl-10α-methoxy-9,10-dihydroergotamine.

4. The compound of claim 1, which is 10α-methoxy-9,10-dihydroergocristine.

5. The compound of claim 1, which is 1-methyl-10α-methoxy-9,10-dihydroergocristine.

6. The compound of claim 1, which is 10α-methoxy-9,10-dihydroergocriptine.

7. The compound of claim 1, which is 1-methyl-10α-methoxy-9,10-dihydroergocriptine.

References Cited

UNITED STATES PATENTS

| | | | |
|---|---|---|---|
| 3,228,943 | 1/1966 | Bernardi et al. | 260—285.5 |
| 3,228,944 | 1/1966 | Bernardi et al. | 260—285.5 |
| 3,336,311 | 7/1967 | Hofmann et al. | 260—268 |

DONALD G. DAUS, Primary Examiner

U.S. Cl. X.R.

204—158; 260—285.5; 424—250, 261